United States Patent
Mizuno et al.

(10) Patent No.: US 6,384,964 B1
(45) Date of Patent: *May 7, 2002

(54) OPTICAL GAIN EQUALIZER, AND METHOD FOR PRODUCING THE OPTICAL GAIN EQUALIZER, AND APPLICATIONS OF THE OPTICAL GAIN EQUALIZER

(75) Inventors: Kazuyo Mizuno; Shoichi Ozawa; Osamu Aso; Shu Namiki; Yuichiro Irie, all of Tokyo (JP)

(73) Assignee: The Furukawa Electric Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/492,007

(22) Filed: Jan. 27, 2000

(30) Foreign Application Priority Data

Jan. 27, 1999 (JP) .................................... 11-017871

(51) Int. Cl.$^7$ ................................................ H01S 3/00
(52) U.S. Cl. ................................................... 359/337.2
(58) Field of Search ................................ 359/194, 308, 359/885, 337, 341, 337.1, 337.11, 337.12, 337.13, 337.2, 337.21, 337.22, 337.3, 337.4, 337.5, 341.1, 341.2, 341.3, 341.31, 341.32, 341.33, 341.4, 341.42, 341.43, 341.44, 341.5; 372/21, 6

(56) References Cited

U.S. PATENT DOCUMENTS

| | | | |
|---|---|---|---|
| 5,351,317 A | * 9/1994 | Weber ............................ 385/3 |
| 5,436,760 A | * 7/1995 | Nakabayashi ............... 359/341 |
| 5,570,221 A | * 10/1996 | Fujita ........................... 359/161 |
| 5,579,153 A | * 11/1996 | Laming et al. .............. 359/341 |
| 5,675,432 A | * 10/1997 | Kosaka ........................ 359/341 |
| 5,774,243 A | * 6/1998 | Majima ....................... 359/124 |
| 5,790,301 A | * 8/1998 | Maeda et al. ............... 359/337 |
| 5,880,874 A | * 3/1999 | Shibuya et al. ............. 359/337 |
| 5,978,529 A | * 11/1999 | Taga et al. ..................... 385/24 |
| 6,055,345 A | * 4/2000 | Ahn et al. ..................... 385/24 |
| 6,061,171 A | * 5/2000 | Taylor et al. ............... 359/341 |
| 6,091,744 A | * 7/2000 | Sorin et al. .................... 372/20 |
| 6,097,535 A | * 8/2000 | Terahara ...................... 359/341 |
| 6,141,130 A | * 10/2000 | Ip ............................... 359/179 |
| 6,151,158 A | * 11/2000 | Takeda et al. .............. 359/341 |

FOREIGN PATENT DOCUMENTS

| | | | |
|---|---|---|---|
| JP | 9-244079 | 9/1997 | ............ G02F/1/35 |
| JP | EP-0794599 A2 | * 10/1997 | ............ H01S/3/06 |
| JP | 9-289349 | 11/1997 | ............ H01S/3/10 |

OTHER PUBLICATIONS

Kim et al., 'Dynamic Gain Equalization of Erbium–Doped Fiber Amplifer with All–Fiber Acousto –OpticsTunable Filters', OFC'98 Technical Digest, pp. 136–138, 1998.*

Su et al., 'Flattening of Erbium–Doped Fibre Amplifier Gain Spectrum Using an Acousto–Optic Tunable Filter', Electronics Letters, March 4th 1993, pp. 477–478.*

(List continued on next page.)

Primary Examiner—Thomas H. Tarcza
Assistant Examiner—Deandra M. Hughes
(74) Attorney, Agent, or Firm—Lacasse & Associates

(57) ABSTRACT

The present invention effectively compensates gain wavelength dependency of optical amplifiers by a simple method. That is, a value smaller than the minimum value of gain, in the range of usage wavelengths, of gain wavelength dependency data of the optical amplifiers is predetermined as a reference gain value. A loss wavelength characteristic which counterbalances the gain greater than the reference gain value is provided as an ideal loss wavelength characteristic which completely compensates the gain wavelength dependency.

22 Claims, 4 Drawing Sheets

OTHER PUBLICATIONS

Toba et al., 'A 100–Channel Optical FDM Six–Stage In–Line Amplifier System Employing Tunable Gain Equalizers', IEEE Photonics Technology Letters, vol. 5, No. 2, Feb. 1993.*

Khaleghi et al., 'Tunable Coherent Optical Transversal EDFA Gain Equalization', Journal of Lightwave Technology, Apr. 1995, pp. 581–587.*

Inoue et al., "Tunable Gain Equalization Using a Mach–Zahnder Optical Filter in Multistage Fiber Amplifiers", IEEE Photonics Technology Letters, vol. 3, No. 8, Aug. 1991, pp. 718–720.*

Mizuno et al. "Development of Etalon–Type Gain–Flattering Filter", Furukawa Review, No. 19, Apr. 17, 2000.

* cited by examiner

OPTICAL GAIN EQUALIZER, AND METHOD FOR PRODUCING THE OPTICAL GAIN EQUALIZER, AND APPLICATIONS OF THE OPTICAL GAIN EQUALIZER

FIELD OF THE INVENTION

The present invention relates to an optical gain equalizer for flattening gain wavelength dependency of an optical amplifier used for optical transmissions, etc., a method for producing the optical gain equalizer, an optical amplifier utilizing the optical gain equalizer, and a wavelength multiplexed light transmission system utilizing the optical amplifier.

BACKGROUND OF THE INVENTION

A wavelength multiplexing system (optical wavelength division multiplexed transmission system) is available as a system to achieve high bit rate transmissions in optical transmission systems. The system is such that optical signals of a plurality of wavelengths different from each other are multiplexed and transmitted in a single optical transmission line consisting of, for example, optical fibers. Various research has been carried out on a wavelength multiplexed light transmission system utilizing the system.

Optical semiconductor amplifiers in which optical semiconductors are utilized have been conventionally researched. Recently, an optical fiber type optical amplifier has been researched, in which a rare metal doped optical fiber such as an erbium doped optical fiber, etc., is used as an amplifying medium, and such an optical fiber type optical amplifier has rapidly been achieved for practical applications. Such an optical amplifier can collectively amplify light of wavelengths in a gain wavelength band. Therefore, it is highly expected that, by applying such an optical amplifier to the wavelength multiplexed light transmission system, a high bit rate and long haul transmission system is achieved.

However, in both an optical fiber type optical amplifier and an optical semiconductor amplifier, the gain thereof has a wavelength dependency. If such a wavelength multiplexed light as described above is collectively made incident into an optical amplifier since the gain size differs, depending on wavelengths of light incident into an optical amplifier, the intensity of light outputted from the optical amplifier will differ, depending on the wavelengths. Due to differences in the outputted light intensity resulting from the wavelengths, a problem of crosstalk between the respective wavelengths occurs. Also, if the intensity of light outputted from an optical amplifier differs, another problem occurs in setting the receiving level, whereby the reception level of a wavelength multiplexed light receiving portion which receives the outputted light must be established at different values depending on, for example, the wavelength of the received light.

Therefore, in order to compensate a gain wavelength dependency of such an optical amplifier, such a method has been proposed, in which a transmission light filter type optical gain equalizer to flatten the gain wavelength dependency of the optical fiber type optical amplifier is produced by a combination of Fabry-Perot etalon filters, and the optical gain equalizer is inserted into an optical fiber type optical amplifier. The method is described in, for example, Japanese Laid-open Patent Publication No. 289349 of 1997. The proposed method flattens gains of an optical amplifier by expanding a gain curve of the optical amplifier with respect to signal light wavelengths to a Fourier series and combining an etalon filter having since-wave type loss characteristics of the same amplitude and cycminimumhose of the since-wave type loss characteristics obtained by the expansion.

OBJECT AND SUMMARY OF THE INVENTION

However, the following problems exist in the method proposed above. That is, the equalizing characteristic T if etalon is expressed by expressions (1), (2) and (3), where the reflection index is R, the incident angle is θ (where the incident angle perpendicularly incident with respect to the filter surface is 0), the refractive index of a filter substrate is n, the thickness of the filter substrate is d, the light speed is c, and the wavelength of the incident light is frequency f. The equalizing characteristic T of etalon is different in a waveform from respective cosine-wave components expanded in the Fourier series. Thus, since, in the abovementioned method, an optical gain equalizer is in an attempt to be formed by an expansion which is not inherently mathematically guaranteed, there remain components which are not compensated even though the gain wavelength dependency of an optical amplifier is attempted to be compensated.

$$T = -10 \times \log_{10}\left[1 + m_i \sin^2\left(\frac{2\pi f}{2} m_2\right)\right] \quad (1)$$

$$m_1 = \frac{4R}{(1-R)^2} \quad (2)$$

$$m_2 = \frac{2nd\sqrt{1 - \sin^2\theta/n^2}}{c} \quad (3)$$

A waveform of any optional form can be expressed in the form of the cosine- or sine-wave infinite series. Therefore, it is considered that, if a very large number of etalon filters are used although the gain wavelength dependency of an optical amplifier cannot be completely compensated, characteristics close to the since-wave loss characteristics obtained by expanding the abovementioned Fourier series can be obtained. Actually, however, it is impossible to form an optical gain equalizer by a very large number of etalon filters which are nearly infinite. For convenience in production, the number of etalon filters is four, at most, which is the limit in view of production. Accordingly, in actuality, the sincewave loss characteristics cannot be obtained by the method proposed above, wherein it is also impossible to only effectively compensate the gain wavelength dependency of an optical gain amplifier.

That is, since, in the abovementioned prior art method, infinite term components obtained by expanding the gain curve of an optical amplifier with respect to signal light wavelengths are in an attempt to be achieved by definite terms (that is, an attempt to be achieved by etalon filters, the usage number of which is limited), the gain wavelength dependency cannot be effectively compensated.

Further, in the case of Fourier series expansion, parameters of expanding terms differ in wavelength cycles selected in an attempt to compensate by an optical gain equalizer, that is, basic cycles of the Fourier series. Accordingly, a remarkably great amount of labor is required in order to determine design matters of etalon, which are obtained by using the Fourier series expansion.

The present invention was developed to solve the abovementioned problems and shortcomings in the prior art methods. It is therefore a first object of the invention to provide an optical gain equalizer which is capable of effectively compensating a gain wavelength dependency of an optical amplifier by a simple method, and a method for producing the same optical gain equalizer. It is a second object of the invention to provide an optical amplifier device having almost no gain wavelength dependency by proposing such an optical gain equalizer, and further it is a third object of the invention to provide a wavelength multiplexed light transmission system which is capable of suppressing the wavelength dependency of light intensity at the receiving side, by using an optical amplifier device in which the optical gain equalizer is used.

In order to achieve the above objects, the invention has the characteristic structures described below. That is, a first aspect of a method for producing an optical gain equalizer according to the invention is featured in that, where it is assumed that a loss wavelength characteristic which completely compensates the gain wavelength dependency of an optical amplifier device in the predetermined set range of wavelengths including at minimum a usage range of wavelengths is the ideal loss wavelength characteristic, N (N: a positive integer) wavelengths different from each other, which are optionally selected in the usage range of wavelengths is $\lambda i$ (i is an integer which increases sequentially from 1 like 1, 2, 3, ... N), and design values of parameters which determine the loss wavelength characteristic of an optical component are $a_1, \ldots, a_m$ having a nonlinear coupling, the respective parameters $a_1, \ldots, a_m$ of the optical component are determined by using a nonlinear fitting method so that the total sum of a square error of a loss value yi at the respective wavelengths $\lambda i$ of the ideal loss wavelength characteristic and a loss value $\lambda i$ at the respective wavelengths in which the design value of the parameter of the optical component is made into a parameter, and an optical gain equalizer is produced by using an optical component having the loss wavelength characteristic which is determined by using the determined parameters $a_1, \ldots, a_m$.

A second aspect of a method for producing an optical gain equalizer according to the invention is featured in that, in addition to the first aspect of a method for producing the optical gain equalizer, a reference gain value which is smaller than the minimum value of gain in the range of usage wavelength of an optical amplifier is predetermined, and a loss wavelength characteristic which counterbalances gain greater than the reference gain value is made into an ideal loss wavelength characteristic.

The first aspect of a method for producing an optical gain equalizer according to the invention is featured in that, where it is assumed that a loss wavelength characteristic which completely compensates the gain wavelength dependency of an optical amplifier device in the predetermined set range of wavelengths including at minimum a usage range of wavelengths is the ideal loss wavelength characteristic, N (N: a positive integer) wavelengths different from each other, which are optionally selected in the usage range of wavelengths is $\lambda i$ (i is an integer which increases sequentially from 1 like 1, 2, 3, ... N), and design values of parameters which determine the loss wavelength characteristic of an optical component are $a_1, \ldots, a_m$ having a nonlinear coupling, the respective parameters $a_1, \ldots a_m$ of the optical component are determined by using a nonlinear fitting method so that the total sum of a square error of a loss value yi at the respective wavelengths $\lambda i$ of the ideal loss wavelength characteristic and a loss value $\lambda i$ at the respective wavelengths in which the design value of the parameter of the optical component is made into a parameter, and an optical component having a loss wavelength characteristic which is determined by the respective parameters is used as a compensating component of a gain wavelength dependency.

Further, an optical component in the optical gain equalizer is featured in that it is composed of an etalon filter element or Mach-Zehnder interference type element.

A first aspect of an optical amplifier device according to the invention is featured in that it has an optical amplifier for amplifying wavelength multiplexed light, and an optical gain equalizer according to the invention is connected to either one of the input side or output side of the optical amplifier.

Also, in another aspect, the optical amplifier device according to the invention is featured in that a plurality of optical amplifiers are disposed in tandem.

Further, in still another aspect, an optical amplifier of the optical amplifier device according to the invention is featured in being an optical semiconductor amplifier or an optical filter type amplifier.

Further, a wavelength multiplexed light transmission system according to the invention is featured in that the system comprises a wavelength multiplexed light transmission portion which multiplexes and transmits light of a plurality of wavelengths different from each other, a wavelength multiplexed light transmission line which transmits wavelength-multiplexed light transmitted from the wavelength multiplexed light transmission portion, and a wavelength multiplexed light receiving portion which receives wavelength-multiplexed light transmitted through the wavelength multiplexed light transmission line, wherein one or more optical gain equalizers according to the invention is provided in the wavelength multiplexed light transmission line.

The method for producing an optical gain equalizer according to the invention is such that, where it is assumed that design values of parameters which determine a loss wavelength characteristic of optical components of an optical gain equalizer to compensate gain wavelength dependency of an optical amplifier are made into $a_1, \ldots, a_m$ which have a nonlinear coupling, and a loss value at respective N wavelengths $\lambda 1$ different from each other, which are optionally selected in a range of usage wavelengths, of a loss wavelength characteristic which completely compensates the gain wavelength dependency of an optical amplifier device in the predetermined set range of wavelengths including at minimum a usage range of wavelengths of the ideal loss wavelength characteristic is yi, and the respective parameters $a_1, \ldots, a_m$ of the optical component are determined by a nonlinear fitting method so that the total sum of a square error of a loss value yi at the respective wavelengths $\lambda i$ and a loss value at the respective wavelengths $\lambda i$ in which the design value of the parameter of the optical component is made into a parameter becomes the minimum value, wherein an optical gain equalizer is produced by using an optical component having the loss wavelength characteristic which is determined by using the determined parameters $a_1, \ldots, a_m$. Therefore, the loss wavelength characteristic of an optical component can be made into the loss wavelength characteristic closest to the ideal loss wavelength characteristic.

In other words, by determining the parameters $a_1, \ldots, a_m$ of an optical component as described above, it becomes possible to achieve an ideal loss characteristic at the highest possible accuracy. This can be mathematically made clear, wherein, by applying the mathematical fact to a method for producing an optical gain equalizer, it is possible to produce an optical gain equalizer in which optical components having the loss wavelength characteristic closest to the ideal loss wavelength characteristic are used. Accordingly, an optical gain equalizer which has been produced by the method is capable of very efficiently compensating the gain wavelength dependency of an optical amplifier.

Furthermore, the method for determining the respective parameters of the respective optical components does not require such a large amount of labor as in the case where prior art Fourier series expansion is used. Therefore, an optical gain equalizer according to the invention is capable of very efficiently compensating the gain wavelength characteristic of an optical amplifier by only a simple method. Also, by forming an optical amplifier device using the optical gain equalizer, an excellent optical amplifier device which has almost no gain wavelength dependency in a range of usage wavelengths can be formed. Also, if a wavelength multiplexing transmission system is constructed by using an optical amplifier device in which the optical gain equalizer is used, it becomes possible to suppress and prevent the wavelength dependency of the received light intensity.

In particular, according to a method for producing an optical gain equalizer of the invention, in which a reference gain value which is smaller than the minimum value of gain in a range of usage wavelengths of an optical amplifier is predetermined, and a loss wavelength characteristic which counterbalances any gain greater than the reference gain value is made into the ideal loss wavelength characteristic, it is possible to easily obtain the ideal loss wavelength characteristic securely.

And, since an optical gain equalizer of the invention is formed by using optical components determined by respective parameters $a_1, \ldots, a_m$ obtained by the method as described above, it is possible to very easily produce the optical gain equalizer. Furthermore, it is possible to obtain an excellent optical gain equalizer which can very efficiently compensate the gain wavelength dependency of an optical amplifier.

Also, by utilizing optical components, which form an optical gain equalizer, consisting of an etalon filter element or Mach Zehnder interference element, an optical gain equalizer of the invention which can bring about such excellent effects and advantages as described above can be easily obtained securely.

Further, since an optical amplifier device of the invention is formed by using an excellent optical gain equalizer as described above, it can be made into an excellent optical amplifier device which has almost no gain wavelength dependency in a range of usage wavelengths.

Still further, according to an optical amplifier device of the invention, which is provided with a plurality of optical amplifiers, it is possible to further efficiently amplify wavelength-multiplexed light by a plurality of optical amplifiers.

And, according to an optical amplifier device of the invention, in which at minimum one of the optical amplifiers is made into an optical semiconductor amplifier, optical amplifiers can be very easily formed by utilizing a prior art semiconductor technology, whereby an optical amplifier device can be easily formed. Also, according to an optical amplifier device of the invention, in which at minimum one of the optical amplifiers is made into an optical fiber type amplifier, light can be directly amplified without being converted to electric signals. Therefore, it is easy to handle, and the optical amplifier device is advantageous in actual applications.

In addition, according to a wavelength multiplexing transmission system using the optical amplifier device provided with an optical gain equalizer according to the invention, it is possible to effectively suppress the wavelength dependency of the received light intensity. Therefore, according to a wavelength multiplexing transmission system of the invention, the problem of crosstalk of the received light can be solved, and such an inconvenience wherein the receiving level of light of the respective wavelengths that must be adjusted at the wavelength multiplexed light receiving portion can be removed. Therefore, the configuration of the system can be facilitated, and it is possible to obtain an excellent system-which enables high bit rate and long haul transmissions.

BRIEF DESCRIPTION OF THE DRAWINGS

These and other objects and advantages of the present invention will become more apparent and more readily appreciated from the following detailed description of the exemplary embodiments of the invention taken in conjunction with the accompanying drawings, in which.

DETAILED DESCRIPTION OF THE PREFERRED EMBODIMENT

Figure 2:
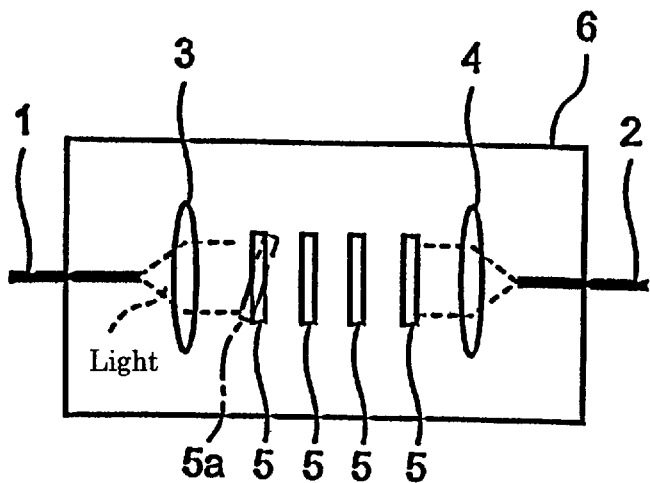
FIG. 2 is a configurational view showing the major parts of a first preferred embodiment of an optical gain equalizer according to the invention.

Hereinafter, a detailed description is given of embodiments of the invention with reference to the accompanying drawings. FIG. 2 is an exemplary view of the configuration of one preferred embodiment of an optical gain equalizer according to the invention.

As shown in the same drawing, in an optical gain equalizer 6 of the preferred embodiment, a plurality of etalon filters (etalon filter elements) 5 are disposed with spacing therebetween. A lens 3 is provided at the input side of light, and another lens 4 is provided at the output side of light. The lens 3 is provided with an interval with respect to the etalon filters 5. A connection end face side of an optical fiber 1 is introduced into an optical gain equalizer 6. Spacing is secured between the connection end face side of the optical fiber 1 and the lens 3. Also, a connection end face side of an optical fiber 2 is introduced into the optical gain equalizer 6 with an interval with respect to the lens 4. The optical fiber 1 is made into an optical input port of the optical gain equalizer 6 while the optical fiber 2 is made into an optical output port of the optical gain equalizer 6. The optical fibers 1 and 2 are optically coupled to etalon filters 5 by collimated beams made by the lenses 3 and 4.

Figure 1A:
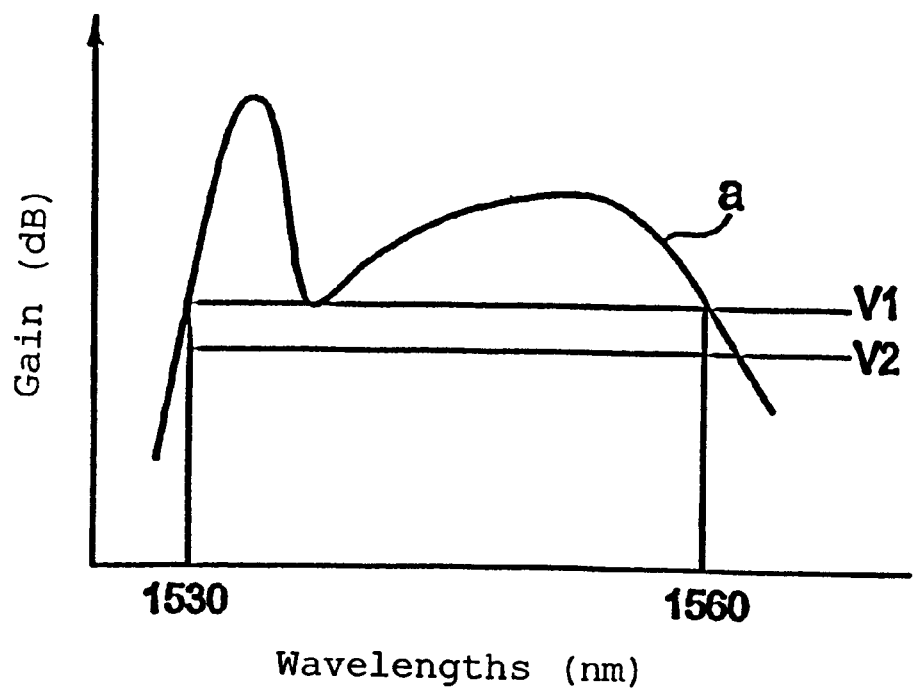
FIG. 1A is a graph showing one example of gain wavelength dependency, which is compensated by an optical gain equalizer according to a preferred embodiment of the invention.

An optical gain equalizer 6 of the preferred embodiment is provided in an optical amplifier device. In FIG. 1A, a gain wavelength characteristic of an optical amplifier which is provided along with the optical gain equalizer 6 in the optical amplifier device is shown. As shown in the same drawing, the optical amplifier has such gain wavelength dependency as shown by the characteristic line a in FIG. 1A, in a range from 1530 nm through 1560 nm in wavelength, which is the range of usage wavelengths.

A feature of the preferred embodiment is in that the etalon filters 5 are caused to have a loss wavelength characteristic which can almost completely compensate the gain wavelength dependency in a preset range of wavelengths, which includes a range of usage wavelengths of the optical amplifier device. In other words, the etalon filters 5 are provided with a loss wavelength dependency very close to the loss wavelength dependency, which can almost completely compensate the gain wavelength dependency as shown by the characteristic line a.

Thus, when forming an optical gain equalizer 6 of the preferred embodiment, the present inventor produced an optical gain equalizer 6 by using the following method. That is, first, in order to obtain the ideal wavelength characteristic which can completely compensate the gain wavelength dependency in a range of usage wavelengths of an optical amplifier device, v2 which is smaller than the minimum value v1 of gain in the range of usage wavelengths was obtained in advance as a reference gain value at the characteristic line a. And, a loss wavelength characteristic which can counterbalance gain greater than the reference gain value v2 was obtained as the ideal loss wavelength characteristic. The ideal loss wavelength dependency is shown by the characteristic line b in FIG. 1B.

Next, it was assumed that N (N: a positive integer) wavelengths different from each other, which is optionally selected in the range of usage wavelengths is made into $\lambda i$ (i: an integer which increases from 1 sequentially like 1, 2, 3, ... N), and design values of parameters having a nonlinear coupling which determines the loss wavelength characteristic of four etalon filters 5 are made into $a_1, \ldots, a_m$. And, the total sum of a square error of a loss value yi at the respective wavelengths $\lambda i$ of the ideal loss wavelength characteristic and a loss value at the respective wavelengths $\lambda i$ of the loss wavelength characteristic where the design values of the parameters of the etalon filters 5 are made into parameters was defined as in the expression (4) below, wherein respective parameters $a_1, \ldots, a_m$ of the etalon filters 5 were determined by using a nonlinear fitting method so that a value of the evaluation function becomes the minimum.

$$f(a_1, \cdots, a_m) = \sum_{i=1}^{N} \left[ \frac{y_i - y(\lambda_i; a_1, \cdots, a_m)}{\sigma_i} \right]^2 \quad (4)$$

In the expression (4), $f(a_1, \ldots, a_m)$ shows functions of the abovementioned parameters $a_1, \ldots, a_m$, and $y(\lambda i: a_1, \ldots, a_m)$ shows loss wavelength characteristics in which the design values of the parameters $a_1, \ldots, a_m$ of the etalon filters 5 at the respective wavelengths $\lambda i$ were made into parameters. Further, σi shows the standard deviation in unevenness between the values from y1 through yi, wherein σi can be determined to be 1 (that is, σi=1).

Next, a brief description is given of a nonlinear fitting method for obtaining sets of parameters by which the values of evaluation functions shown in the expression (4) become the minimum. Where it is assumed that a set P of certain specified parameters is made into an origin of a coordinate system, and a set of parameters based on this point is made into a, an evaluation function f(a) becomes the following expression (5) by approximating it to the Taylor series.

$$f(a) = f(P) + \sum \frac{\partial f}{\partial a_1} a_1 + \frac{1}{2} \sum_{i,j} \frac{\partial^2 f}{\partial a_i \partial a_j} a_i a_j + \cdots \quad (5)$$

$$\approx c + b \cdot a + \frac{1}{2} a \cdot A \cdot a$$

In the expression (5), c, b and A are, respectively, expressed by the following expressions (6), (7) and (8).

$$c = f(P) \quad (6)$$

$$b = -\nabla f|_P \quad (7)$$

$$|A|_{ij} = \left. \frac{\partial^2 f}{\partial a_i \partial a_j} \right|_P \quad (8)$$

If an inclination $\nabla f(a)$ is obtained by using an approximation expression, the inclination $\nabla f(a)$ becomes an expression (9), and it is expressed as in an expression (10) at a certain set $a_1$ of parameters.

$$\nabla f(a) = A \cdot a - b \quad (9)$$

$$\nabla f(a_i) = A \cdot a_i - b \quad (10)$$

Herein, where it is assumed that a set of parameters when the inclination of f becomes 0 is made into $a_{min}$, an expression (11) can be established with respect to the set of parameters. At this time, the set is made into a set of parameters at which the evaluation function shown in the expression (4) becomes the minimum value.

$$A \cdot a_{min} = b \quad (11)$$

Therefore, the next expression (12) can be obtained from the expressions (10) and (11)

$$a_{min} - a_i = A^{-1} \cdot [-\nabla f(a_i)] \quad (12)$$

Herein, since a function of f is already known, the right side of the expression (12) will be known, wherein it is possible to obtain the $a_{min}$ by substituting a certain trial parameter $a_i$ in the expression. Also, in the expressions (13) and (14), the expression (12) can be rewritten as in an expression (15).

$$\beta_i = -\frac{1}{2}\frac{\partial f}{\partial a_i} \quad (13)$$

$$\alpha_{ij} = \frac{1}{2}\frac{\partial^2 f^2}{\partial a_i \partial a_j} \quad (14)$$

$$\sum_{j=1}^{M}\alpha_{ij}\delta a_j = \beta_i \quad (15)$$

The expression (15) is solved to obtain an increment $\sigma a_j$, and this increment $\sigma a_j$ is added to the current approximation product, wherein an operation of obtaining the next approximation product is repeated. Therefore, finally, the parameters $a_1, \ldots, a_m$ in the expression (4) are obtained.

Further, the Levenberg-Marquardt method has been proposed to obtain an expression (16), in which a reciprocal $1/\alpha_{jj}$ of a diagonal factor of A and fuzzic factor $\eta$ are used as a method for efficiently obtaining an approximation product. Therefore, the parameters $a_1, \ldots, a_m$ may be obtained.

$$\sum_{j=1}^{M}\frac{1}{\eta\alpha_{jj}}\delta a_j = \beta_i \quad (16)$$

In the preferred embodiment, as described above, four etalon filters 5 are used as optical components which constitute an optical gain equalizer 6, wherein by combining these etalon filters 5, the gain wavelength dependency of an optical amplifier shown in FIG. 1 can be flattened. An equalizing loss wavelength characteristic T which is obtained when the four etalon filters 5 are combined becomes as in an expression (19) when the following expressions (17) and (18) are provided.

$$m_{2j-1} = \frac{4R_j}{(1-R_j)^2} \quad (17)$$

$$m_{2j} = \frac{2n_j d_j \sqrt{1-\sin^2\theta_j/n_j^2}}{c} \quad (18)$$

$$T = -10\times\log_{10}\left[1+m_1\sin^2\left(\frac{2\pi f}{2}m_2\right)\right]- \quad (19)$$
$$10\times\log_{10}\left[1+m_3\sin^2\left(\frac{2\pi f}{2}m_4\right)\right]-$$
$$10\times\log_{10}\left[1+m_5\sin^2\left(\frac{2\pi f}{2}m_6\right)\right]-$$
$$10\times\log_{10}\left[1+m_7\sin^2\left(\frac{2\pi f}{2}m_8\right)\right]$$

Figure 1B:
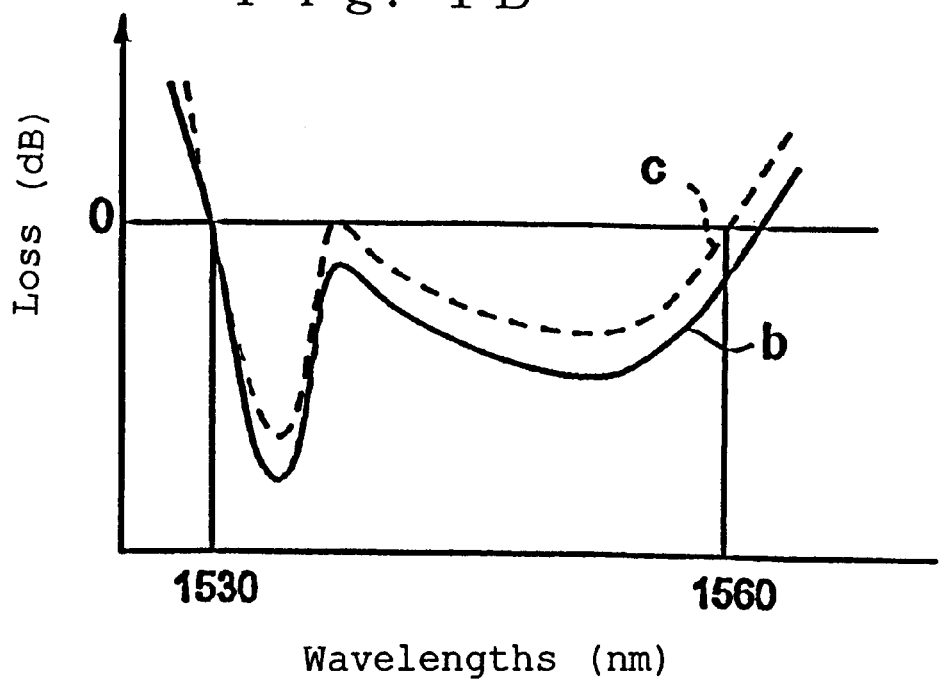
FIG. 1B is a graph showing the ideal loss wavelength characteristic to compensate the gain wavelength dependency.

In the preferred embodiment, $m_1$ through $m_8$ corresponding to the parameters $a_1, \ldots, a_m$ of the etalon filters 5 were obtained so that the total sum of a square error of the ideal loss wavelength characteristic shown by the characteristic line in FIG. 1B and an equalizing loss wavelength characteristic T shown by the expression (19) becomes the minimum value. The results became $m_1=0.199$, $m_2=0.911\times10^{-12}$, $m_3=0.345$, $m_4=0.851\times10^{-12}$, $m_5=0.405$, $m_6=0.611\times10^{-12}$, $m_7=0.953$, and $m_8=0.324\times10^{-12}$.

Although $m_{2j-1}$ can be determined by only the reflection index $R_j$ on the basis of such a nonlinear fitting method as shown above, $m_{2j}$ has a degree of freedom in a refractive index $n_j$, incident angle $\theta_j$, and thickness $d_j$, for example, in the preferred embodiment, the incident angle is set to 0 so that no polarization dependency exists, thereby determining the refractive index and thickness. As a result, where the incident angle is 0, $R_1=4.5\%$, $R_2=7.4\%$, $R_3=8.5\%$, and $R_4=16.6\%$ are obtained, and $d_1=89.3$ μm, $d_2=83.5$ μm, $d_3=59.9$ μm, and $d_4=31.7$μm are obtained. These values are figures obtained where the refractive index of a filter substrate (glass substrate) is 1.53, wherein the respective suffixes show the number of etalon filters 5.

Figure 3:
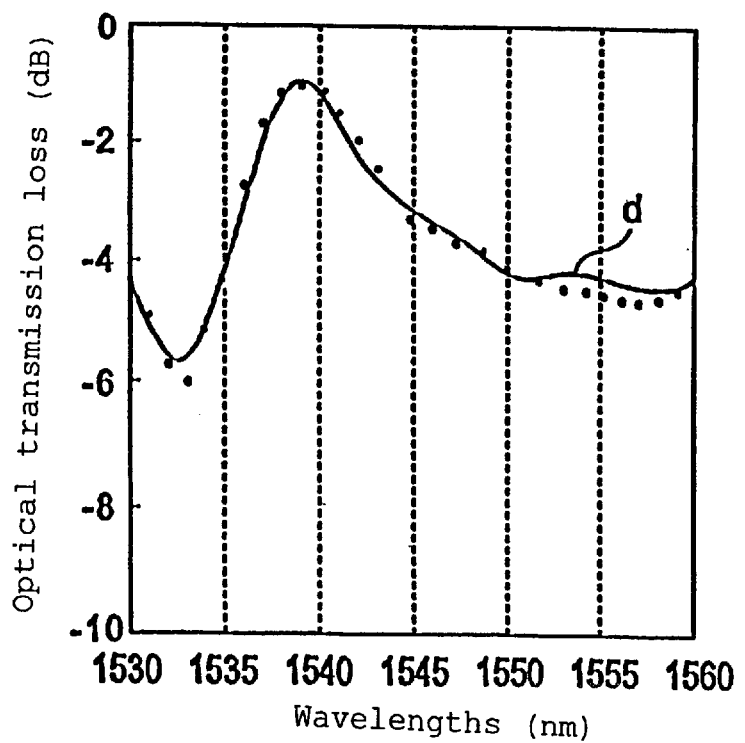
FIG. 3 is a graph showing loss values at a plurality of wavelengths different from each other, which are optionally selected from the graph of gain wavelength dependency shown by a characteristic line b in FIG. 1B, and optical equalizing losses at the respective wavelengths of an etalon filter according to the preferred embodiment while comparing the two with each other.

FIG. 3 shows a relationship between a loss value yi of the ideal loss wavelength characteristic shown by the characteristic line b in FIG. 1B at a plurality of wavelengths λi (i: an integer which increases from 1 sequentially like 1, 2, 3, ... N), which is optionally selected in the range (approx. 1530 nm through 1560 nm) of usage wavelengths of an optical amplifier device and a loss wavelength characteristic at the optical gain equalizer in the preferred embodiment. Also, in the same drawing, • shows the respective loss values yi, and the characteristic line d shows a loss wavelength characteristic in the optical gain equalizer of the preferred embodiment. As has been made clear in FIG. 3, the optical gain equalizer 6 of the preferred embodiment will have obtained a loss wavelength characteristic very close to the abovementioned ideal loss wavelength characteristic.

According to the preferred embodiment, as described above, the total sum of a square error of the loss value yi at the respective wavelengths λi of the ideal loss wavelength characteristic and a loss value at the respective wavelengths λi of the loss wavelength characteristic where the design values of the parameters of the etalon filters 5 are made into parameters is defined by an evaluation function (expression (4)), wherein since the respective parameters $a_1, \ldots, a_m$ of the etalon filters 5 are determined so that the value (total sum) becomes the minimum value (in detail, $m_1$ through $m_4$ of the expression (19) and $R_1$ through $R_4$ and d1 through d4 are determined in order to establish $m_1$ through $m_4$ were determined), the loss wavelength characteristic of the optical gain equalizer 6 could be made into a characteristic very close to the ideal loss wavelength characteristic as shown in FIG. 3.

That is, according-to the preferred embodiment, since the value of the expression (4) is devised to be the minimum value, it is mathematically made clear that the ideal loss wavelength dependency can be re-generated at the highest possible accuracy. Since the mathematical fact is applied to a method for producing an optical gain equalizer 6, etalon filters 5 having the loss wavelength characteristic closest to the ideal loss wavelength characteristic are used to produce the optical gain equalizer 6. Therefore, by constructing an optical amplifier device by combining the optical gain equalizer 6 of the preferred embodiment with the optical amplifier, the gain wavelength dependency of the optical amplifier provided in an optical amplifier device can be almost completely compensated.

Moreover, according to the preferred embodiment, since a great amount of labor is not required as in the case of using prior art Fourier series expansion is not required when determining the respective parameters of the abovementioned etalon filters 5, the respective parameters can be very quickly determined. Accordingly, the optical gain equalizer 6 of the preferred embodiment can be made into an excellent optical gain equalizer 6 which is capable of very efficiently compensating the gain wavelength dependency of an optical amplifier by a simple method.

Still further, in the preferred embodiment, since the angle of the etalon filters 5 is determined so that the incident angle of light into the etalon filters 5 becomes zero, it is possible to obtain an optical gain equalizer 6 having no polarization dependency.

Figure 4:
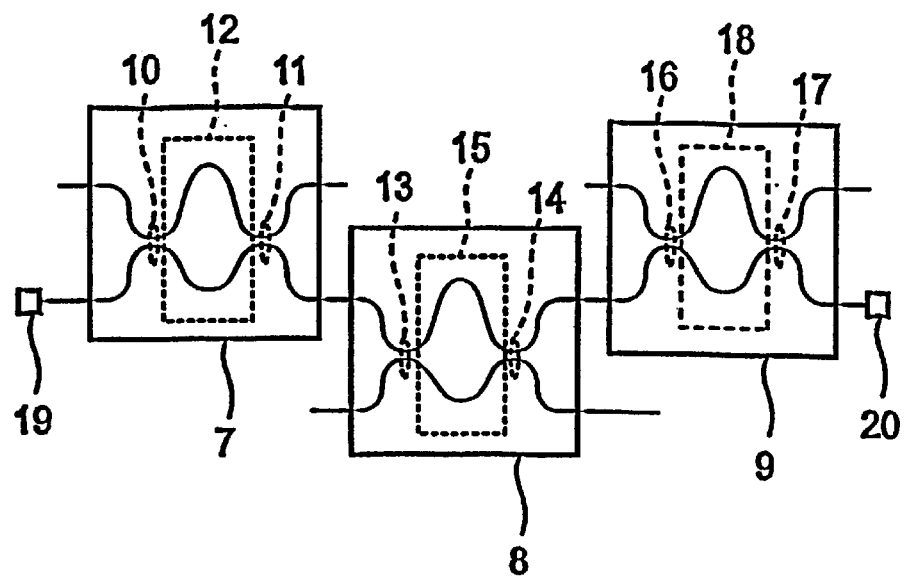
FIG. 4 is a configurational view showing the major parts of a second preferred embodiment of an optical equalizer according to the invention.

FIG. 4 shows a construction of the major parts of the second preferred embodiment of an optical gain equalizer according to the invention. As shown in the same drawing, an optical gain equalizer 6 of the second preferred embodiment is constructed of three Mach-Zehnder interference optical elements (Mach-Zehnder interference elements) 7, 8, and 9. In the drawing, 19 indicates an optical input portion, and 20 indicates an optical output portion. The Mach-Zehnder interference optical element is formed, as has already been known, by two optical waveguides to make the lengths thereof different from each other. As shown in FIG. 4, the respective Mach-Zehnder interference optical elements 7, 8 and 9 have optical path differing portions 12, 15 and 18 between two directivity couplers 10 and 11, 13 and 14, and 16 and 17.

The second preferred embodiment differing from the first preferred embodiment is featured in that an optical gain equalizer 6 is formed by using such Mach-Zehnder interference optical elements 7, 8, and 9 instead of the etalon filters 5. In the second preferred embodiment, parameters, which determine the equalizing loss wavelength characteristics of the respective Mach-Zehnder interference optical elements 7, 8 and 9, are obtained by a method almost similar to that of the first preferred embodiment. And, an optical gain equalizer 6 is formed by using Mach-Zehnder interference optical elements 7, 8 and 9 having the equalizing loss wavelength characteristics determined by these parameters.

Also, in the second preferred embodiment, in order to obtain the ideal loss wavelength characteristics which completely compensate the gain wavelength dependency in a range of usage wavelengths of an optical amplifier, at the characteristic line a in FIG. 1A, the minimum value v1 of gain in the range of usage wavelengths is predetermined as a reference gain value. A loss wavelength characteristic which counterbalances the gain greater than the reference gain value v1 is obtained as the ideal loss wavelength characteristic as shown by the characteristic line c in FIG. 1B, wherein on the basis of the ideal loss wavelength characteristic, parameters to determine the loss wavelength characteristic of the Mach-Zehnder interference optical elements 7, 8 and 9 were obtained.

Generally, Mach-Zehnder interference optical elements have almost the same functions as those of the etalon filters, and the equalizing loss wavelength characteristic is shown by the following expression (20).

$$T = 10 \times \log_{10}[1 - 2\alpha(1-2\alpha) \times (1-\cos 2k\Delta L)] \tag{20}$$

Further, in the expression (20), $k=2\pi n/\lambda$ is obtained, $\alpha$ indicates a coupling efficiency of the directivity coupler, $\Delta L$ is an optical path length difference, and n indicates the refractive index of the optical path.

The equalizing loss wavelength characteristic obtained when combining three Mach-Zehnder interference optical elements can be expressed by an expression (21). The present inventor obtained $m_1$ through $m_6$ so that the square error of the ideal loss wavelength characteristic shown by, for example, the characteristic line c in FIG. 1B and the equalizing loss wavelength characteristic T of the expression (21) becomes the minimum value, and carried out a combination in which these $m_1$ through $m_6$ are used as parameters, whereby parameters to determine the loss wavelength characteristic of the respective Mach-Zehnder interference optical elements 7, 8 and 9 were determined.

$$T = 10 \times \log_{10}[1 - 2m_1(1-2m_1) \times (1-\cos 2km_2)] + \tag{21}$$
$$10 \times \log_{10}[1 - 2m_3(1-2m_1) \times (1-\cos 2km_4)] +$$
$$10 \times \log_{10}[1 - 2m_5(1-2m_1) \times (1-\cos 2km_6)]$$

The results became $m_1=0.11396$, $m_2=27.983$, $m_3=0.19337$, $m_4=45.034$, $m_5=0.25$, and $m_6=58.074$. If the coupling efficiency and optical path length difference in the respective Mach-Zehnder interference optical elements 7, 8 and 9 are obtained on the basis of these figures, the results became $\alpha_1=11.396\%$, $\alpha_2=19.337\%$, $\alpha_3=25.000\%$, $\Delta L_1=27.983\,\mu m$, and $\Delta L_2=45.034\,\mu m$, $\Delta L_3=58.074\%$, wherein the suffixes indicate the number of Mach-Zehnder interference optical elements 7, 8 and 9, and suffix 1 is provided for the Mach-Zehnder interference optical element 7, suffix 2 is provided for the Mach-Zehnder interference optical element 8, and suffix 3 is provided for the Mach-Zehnder interference optical element 9.

Figure 5:
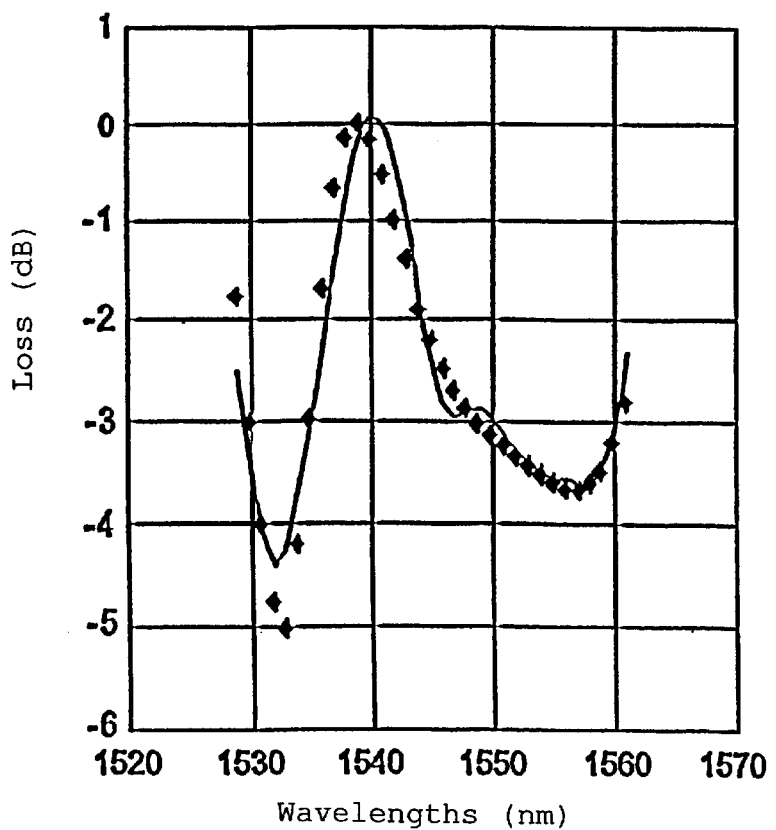
FIG. 5 is a graph showing loss values at a plurality of wavelengths different from each other, which are optionally selected from the graph of gain wavelength dependency shown by a characteristic line b in FIG. 1B, and optical equalizing losses at the respective wavelengths of a Mach Zehnder interference optical element according to the second preferred embodiment while comparing the two with each other.

FIG. 5 shows a relationship between a loss value yi of the ideal loss wavelength characteristic shown by the characteristic line c in FIG. 1B, and the loss wavelength characteristic at an optical gain equalizer of the second preferred embodiment, at a plurality of wavelengths $\lambda i$ (i: an integer which increases sequentially from 1 like 1, 2, 3, . . . , N) which are optically selected in a range of usage wavelengths of an optical amplifier device. In the same drawing, ♦ indicates the respective loss values yi, and a characteristic line e indicates the loss wavelength characteristic at the optical gain equalizer 6 of the second preferred embodiment. As has been made clear in FIG. 5, the optical gain equalizer 6 of the second preferred embodiment will have a loss wavelength characteristic very close to the ideal loss wavelength characteristic.

Since the second preferred embodiment is capable of, as described above, making the loss wavelength characteristic of the optical gain equalilzer 6 into a characteristic very close to the ideal loss wavelength characteristic, the second embodiment also brings about almost the same effects as those in the first preferred embodiment.

Figure 6A:
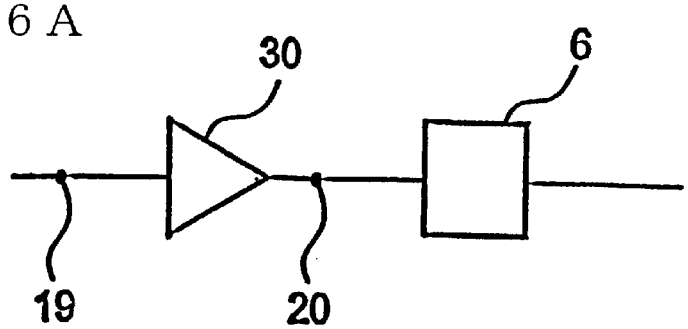
FIGS. 6A and 6B are explanatory views of the respective embodiments of an optical amplifier device in which an optical gain equalizer according to the invention is used.
Figure 6B:
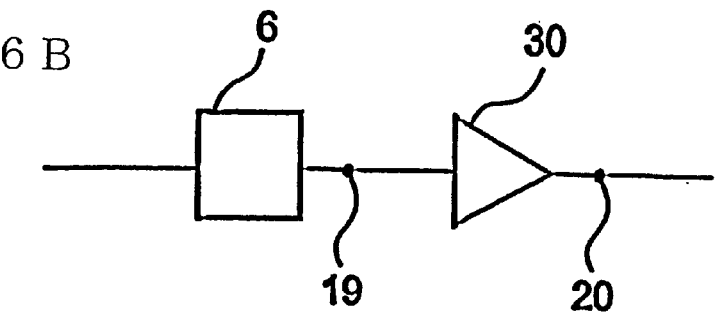

FIG. 6A and FIG. 6B are system configurational views of a preferred embodiment of an optical amplifier device using the optical gain equalizer 6 according to the invention. An optical amplifier device of the preferred embodiment has an optical amplifier 30 which amplifies wavelength-multiplexed light. The optical amplifier device illustrated in FIG. 6A is such that an optical gain equalizer 6 is connected to the optical output portion 20 side which is the output side of the optical amplifier 30, and that shown in FIG. 6B is such that the optical gain equalizer 6 is connected to the optical input portion 19 side which is the input side of the optical amplifier 30. The optical amplifier 30 may be an optical semiconductor amplifier or an optical fiber type optical amplifier.

The optical amplifier device of the preferred embodiment is featured in that the optical gain equalizer 6 is made into an optical gain equalizer 6 as shown in the first and the second preferred embodiments. In this preferred embodiment, the optical gain equalizer 30 has a gain wavelength dependency shown by the characteristic line in FIG. 1A.

In the preferred embodiment, the gain wavelength dependency in the range of usage wavelengths of the optical amplifier 30 can be almost completely compensated by an optical gain equalizer 6 secured at the output side or input side of the optical amplifier 30. Therefore, the optical amplifier device of the preferred embodiment can be made into an excellent optical amplifier device which has almost no gain wavelength dependency in the range of usage wavelengths and in which a flattening of the gain can be achieved.

Further, in the preferred embodiment, where the optical amplifier device 30 is constructed of an optical semiconductor amplifier, the optical amplifier 30 can be very easily formed by using prior art technologies for producing optical amplifiers. Therefore, it is possible to easily produce an optical amplifier device. Also, where the optical amplifier 30 is constructed of an optical fiber type optical amplifier, the optical fiber type optical amplifier can directly amplify light as it is, whereby it is very easy to handle the amplifier and possible to create a very practical optical amplifier.

Figure 7:
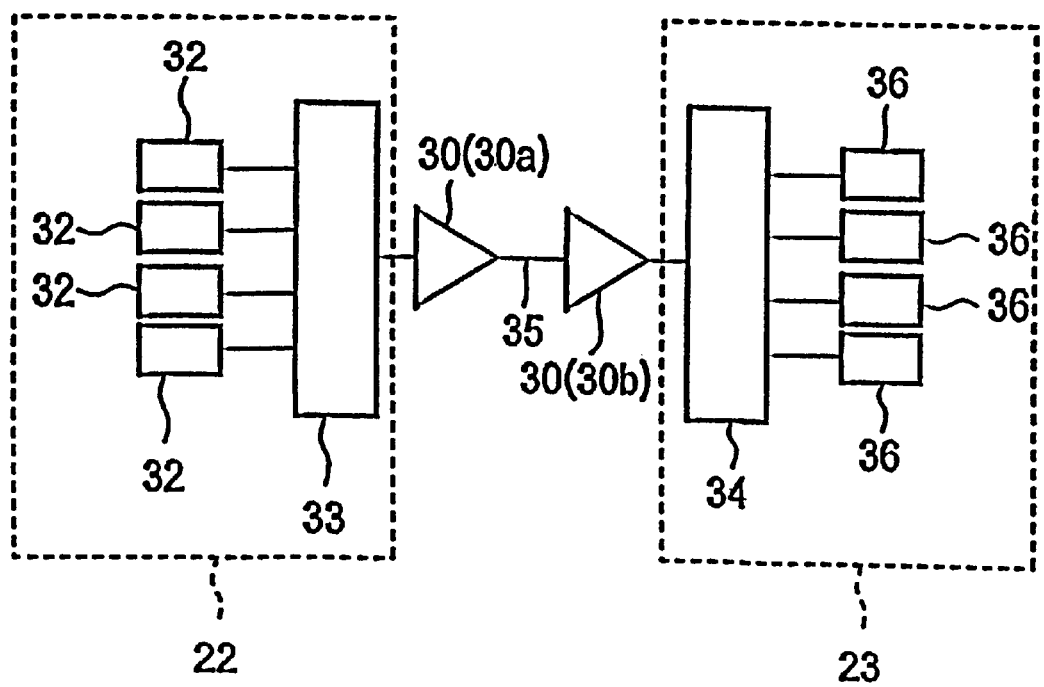
FIG. 7 is a configurational view of a system showing one example of a wavelength-multiplexed light transmission system in which an optical gain equalizer according to the invention is used.

In FIG. 7, one embodiment of a wavelength multiplexed light transmission system using an optical gain equalizer according to the preferred embodiment is illustrated by using a system configurational view. As shown in the same drawing, a wavelength multiplexed light transmission system according to the invention includes a wavelength multiplexing transmission portion 22 which multiplexes and transmits light of a plurality of wavelengths different from each other, a wavelength multiplexed light transmission line 35, formed of optical fibers, etc., which transmits wavelength multiplexed light transmitted from the wavelength multiplexing transmission portion 22, and a wavelength multiplexed light receiving portion 23 which receives wavelength multiplexed light transmitted through the wavelength multiplexed light transmission line 35. The wavelength multiplexing transmission system is featured in that the wavelength multiplexed light transmission line 35 is provided with a plurality of optical amplifier devices 30 (30a, 30b) provided with optical gain equalizers (two equalizers in the same drawing) according to the preferred embodiment.

The wavelength multiplexed light transmission portion 22 has a plurality of optical transmitters 32 and an optical coupler 33, which receives light of wavelengths different from each other from the respective optical transmitters 32 and the light is synthesized by the optical coupler 33 and is transmitted. Also, the wavelength multiplexed light receiving portion 23 has an optical coupler 34 and a plurality of light receivers 36, wherein the received wavelength multiplexed light is divided by the optical coupler 34, wherein light of the respective wavelengths is received by the respective light receivers 36.

In the wavelength multiplexing transmission system of the preferred embodiment, the wavelength multiplexed light transmitted from the wavelength multiplexed light transmission portion 22 is amplified by an optical amplifier device 30a and is made incident into the wavelength multiplexed light transmission line 35. Next, the light is transmitted through the wavelength multiplexed light transmission line 35, and the transmitted light is amplified by another optical amplifier device 30b, wherein the light is again made incident into the wavelength multiplexed light transmission line 35 for transmission, and the light is received by the wavelength multiplexed light receiving portion 23. In the preferred embodiment, since the optical amplifier devices 30a and 30b are optical amplifier devices provided-with an optical gain equalizer of the present invention, almost no gain wavelength dependency of the light amplified by the optical amplifiers in the optical amplifier devices 30a and 30b exists. Therefore, the intensity of the wavelength multiplexed light received by the wavelength multiplexed light receiving portion 23 has almost no wavelength dependency.

Therefore, according to the wavelength multiplexing transmission system of the preferred embodiment, it is possible to construct an excellent system having almost no problems such as crosstalk of the received light. Moreover, for example, in the wavelength multiplexed light receiving portion 23, it is not necessary to carry out cumbersome operations such as setting the receiving level of the respective light receivers 36 to levels different from each other, whereby such an excellent system can be very easily constructed and enables high bit rate and long haul transmissions to be produced.

Furthermore, the present invention is not limited to the respective embodiments described above, but may be subjected to various modifications of the embodiments. For example, in the first preferred embodiment of the optical gain equalizer, the figure v2 in FIG. 1A is made into a reference gain value when obtaining the ideal loss wavelength characteristic, and in the second preferred embodiment of the optical gain equalizer, the figure v1 in FIG. 1A is made into a reference gain value when obtaining the ideal loss wavelength characteristic. However, the reference gain value predetermined to obtain the ideal loss wavelength characteristic may be a figure which is less than the minimum value of the gain in the range of usage wavelengths. Therefore, the reference gain value may be a figure which is smaller than v2 or may be greater than v2 but smaller than v1.

Furthermore, in the first preferred embodiment of the optical gain equalizer, although the optical gain equalizer 6 is formed by using four etalon filters 5, the number of etalon filters 5 is not specially limited, and may be adequately determined.

Still further, in the first preferred embodiment of the optical gain equalizer, although the incident angle of the four etalon filters 5 is set to 0, the incident angle of the talon filters 5 is not necessarily set to 0, but the etalon filters 5 may be diagonally disposed with respect to the lenses 3 and 4 as in the talon filters 5a shown by the broken line in FIG. 2. Thus, since the incident angle of the etalon filters 5 may be adjusted, there may be cases where the loss wavelength characteristic of the etalon filter 5 can be drawn nearer to the ideal loss wavelength characteristic.

Further, although, in the second preferred embodiment of the optical gain equalizer, an optical gain equalizer 6 has been constructed of three Mach-Zehnder interference optical elements 7, 8 and 9, the number of these Mach-Zehnder interference optical elements is not specifically limited, but may be adequately determined.

Further, the optical gain equalizer of the invention is not necessarily formed of etalon filters, or Mach-Zehnder interference optical elements, etc. If any optical component in which respective parameters $a_1, \ldots, a_m$ of the optical component have a nonlinear coupling even though they are other than the etalon filters or Mach-Zehnder interference optical elements, an ideal optical gain equalizer maybe formed by using an optical component having a loss wavelength characteristic determined by parameters $a_1, \ldots, a_m$ which are obtained by the nonlinear fitting method so that the total sum of a square error of the loss value yi at the respective wavelengths $\lambda i$ of the ideal loss wavelength-characteristic, shown by the respective parameters $a_1, \ldots, a_m$ of the optical component and a loss value at the respective wavelengths $\lambda i$ of the loss wavelength characteristic in which the design values of the parameters of the optical component are made into parameters becomes the minimum value.

Further, although, in the preferred embodiment of the optical amplifier device, the optical amplifier device is formed by using one optical amplifier 30 and one optical gain equalizer 6, the optical amplifier device may be provided with a plurality of one or both of optical amplifier 30 and optical gain equalizer 6.

Still further, in the preferred embodiment of the wavelength multiplexing transmission system, the wavelength multiplexed light transmitting portion 22 has a plurality of optical transmitters 32, wherein light of wavelengths different from each other, which is transmitted from these optical transmitters 32 is synthesized by an optical coupler 33 for transmission. However, in the wavelength multiplexed light transmitting portion 22, one optical transmitter which transmits light of a plurality of wavelengths different from each other, for example, a DFB (division feedback type) laser, may be used.

What is claimed is:

1. A method for producing an optical gain equalizer comprising the steps of:

providing a target loss wavelength characteristic for compensating a gain wavelength dependency of an optical amplifier device within a predetermined set range of wavelengths including $\lambda_i$, wherein i is an integer between 1 and N;

providing parameters $a_1, \ldots, a_m$ relating to production of an optical component having a loss wavelength characteristic, the loss wavelength characteristic of the optical component being determined in dependence upon set values of the provided parameters $a_1, \ldots, a_m$;

setting values for the parameters $a_1, \ldots, a_m$ with respect to each of the wavelengths $\lambda_i$;

determining the total sum, for i=1 to N, of a square error of a loss value $y_i$ of the target loss wavelength characteristic and a loss value $y(\lambda_i; a_1, \ldots, a_m)$ of an optical component represented by the set values;

determining final values for the parameters $a_1, \ldots, a_m$ using a non-linear fitting method, such that the total sum of the square error is substantially a minimum value; and, producing the optical gain equalizer including an optical component having the final values for the parameters $a_1, \ldots, a_m$, such that the optical gain equalizer has substantially the target loss wavelength characteristic in the predetermined set range of wavelengths.

2. A method for producing an optical gain equalizer as set forth in claim 1, wherein a reference gain value which is smaller than the minimum value of gain in a range of usage wavelengths of an optical amplifier is predetermined, and a loss wavelength characteristic which counterbalances gain greater than said reference gain value is made into the target loss wavelength characteristic.

3. An optical gain equalizer comprising:

an optical component having a predetermined loss wavelength characteristic for compensating a gain wavelength dependency of an optical amplifier device within a predetermined set range of wavelengths including $\lambda_i$, wherein i is an integer between 1 and N, the predetermined loss wavelength characteristic being dependent upon set values of parameters $a_1, \ldots, a_m$ relating to production of the optical component, wherein the values of parameters $a_1, \ldots, a_m$ are set as follows:

a target loss wavelength characteristic for compensating the gain wavelength dependency of the optical amplifier device within the predetermined set range of wavelengths is provided;

the total sum, for i=1 to N, of a square error of a loss value $y_i$ of the target loss wavelength characteristic and a loss value $y(\lambda_i; a_1, \ldots, a_m)$ of an optical component represented by the set values is determined; and final values for the parameters $a_1, \ldots, a_m$ are set using a non-linear fitting method, such that the total sum of the square error is substantially a minimum value.

4. An optical gain equalizer as set forth in claim 3, wherein the optical component is constructed of an etalon filter element.

5. An optical gain equalizer as set forth in claim 3, wherein the optical component is constructed of a Mach-Zehnder interference element.

6. An optical amplifier device, having optical amplifiers for amplifying wavelength-multiplexed light, wherein an optical gain equalizer as set forth in claim 3 is connected to at minimum either of the input side or the output side of said optical amplifiers.

7. An optical amplifier device, having optical amplifiers for amplifying wavelength-multiplexed light, wherein an optical gain equalizer as set forth in claim 4 is connected to at minimum either of the input side or the output side of said optical amplifiers.

8. An optical amplifier device, having optical amplifiers for amplifying wavelength-multiplexed light, wherein an optical gain equalizer as set forth in claim 5 is connected to at minimum either of the input side or the output side of said optical amplifiers.

9. An optical amplifier device as set forth in claim 6, wherein the optical amplifiers are disposed in tandem in a plurality.

10. An optical amplifier device as set forth in claim 7, wherein the optical amplifiers are disposed in tandem in a plurality.

11. An optical amplifier device as set forth in claim 8, wherein the optical amplifiers are disposed in tandem in a plurality.

12. An optical amplifier device as set forth in claim 1, wherein the optical amplifiers are constructed of optical semiconductor amplifiers.

13. An optical amplifier device as set forth in claim 9, wherein at minimum one of the optical amplifiers is an optical semiconductor amplifier.

14. An optical amplifier device as set forth in claim 10, wherein at minimum one of the optical amplifiers is an optical semiconductor amplifier.

15. An optical amplifier device as set forth in claim 11, wherein at minimum one of the optical amplifiers is an optical semiconductor amplifier.

16. An optical amplifier device as set forth in claim 1, wherein the optical amplifiers are constructed of optical fiber type amplifiers.

17. An optical amplifier device as set forth in claim 9, wherein the optical amplifiers are constructed of optical fiber type amplifiers.

18. An optical amplifier device as set forth in claim 10, wherein the optical amplifiers are constructed of optical fiber type amplifiers.

19. An optical amplifier device as set forth in claim 11, wherein the optical amplifiers are constructed of optical fiber type amplifiers.

20. A wavelength multiplexing transmission system, comprising a wavelength multiplexed light transmission portion which multiplexes light of a plurality of wavelengths different from each other; a wavelength multiplexed light transmission line which transmits wavelength-multiplexed light transmitted from said wavelength multiplexed light transmission portion; and a wavelength multiplexed light receiving portion which receives the wavelength multiplexed light transmitted through said wavelength multiplexed light transmission line, wherein one or more optical amplifier devices described in claim 6 are provided in said wavelength multiplexed light transmission line.

21. A wavelength multiplexing transmission system, comprising a wavelength multiplexed light transmission portion which multiplexes light of a plurality of wavelengths different from each other; a wavelength multiplexed light transmission line which transmits wavelength-multiplexed light transmitted from said wavelength multiplexed light transmission portion; and a wavelength multiplexed light receiving portion which receives the wavelength multiplexed light transmitted through said wavelength multiplexed light transmission line, wherein one or more optical amplifier devices described in claim 7 are provided in said wavelength multiplexed light transmission line.

22. A wavelength multiplexing transmission system, comprising a wavelength multiplexed light transmission portion which multiplexes light of a plurality of wavelengths different from each other; a wavelength multiplexed light transmission line which transmits wavelength-multiplexed light transmitted from said wavelength multiplexed light transmission portion; and a wavelength multiplexed light receiving portion which receives the wavelength multiplexed light transmitted through said wavelength multiplexed light transmission line, wherein one or more optical amplifier devices described in claim 8 are provided in said wavelength multiplexed light transmission line.

* * * * *